United States Patent
Martin et al.

(10) Patent No.: US 11,285,959 B2
(45) Date of Patent: Mar. 29, 2022

(54) SYSTEMS AND METHODS FOR IMPROVING FUEL ECONOMY AND REDUCING EMISSIONS

(71) Applicant: Ford Global Technologies, LLC, Dearborn, MI (US)

(72) Inventors: Douglas Martin, Canton, MI (US); John Rollinger, Troy, MI (US); Julia Buckland Seeds, Commerce Charter Township, MI (US); Joseph Lyle Thomas, Farmington Hills, MI (US); Joshua Schumaker, Dearborn, MI (US); Adam Richards, Canton, MI (US); John Erik Mikael Hellstrom, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 16/789,247

(22) Filed: Feb. 12, 2020

(65) Prior Publication Data
US 2021/0245756 A1   Aug. 12, 2021

(51) Int. Cl.
*B60T 7/12* (2006.01)
*B60W 30/188* (2012.01)
(Continued)

(52) U.S. Cl.
CPC ......... *B60W 30/1882* (2013.01); *B60K 15/03* (2013.01); *B60W 10/06* (2013.01);
(Continued)

(58) Field of Classification Search
CPC .... F02B 19/1052; F02B 19/1085; F02D 3/04; F02D 19/024; F02D 35/0046;
(Continued)

(56) References Cited

U.S. PATENT DOCUMENTS 8,763,582 B2   7/2014 Lewis et al.
9,966,057 B1 *   5/2018 Wang .................. F02N 19/00
(Continued)

FOREIGN PATENT DOCUMENTS

DE   102017112643 A1   12/2017

OTHER PUBLICATIONS

"MultiAir," Wikipedia Website, Available Online at https://en.wikipedia.org/wiki/MultiAir, Jun. 29, 2009, 4 pages.
(Continued)

*Primary Examiner* — John Kwon
(74) *Attorney, Agent, or Firm* — Geoffrey Brumbaugh; McCoy Russell LLP

(57) ABSTRACT

Methods and systems are provided for improving fuel economy and reducing undesired emissions. In one example, a method may include in response to an engine speed being within a first threshold speed of an engine idle speed during a speed reduction request with engine cylinders unfueled, maintaining the cylinders unfueled, and controlling the engine to a desired stopping position responsive to the engine speed being greater than a second threshold speed lower than the idle speed. In this way, fuel usage and emissions may be reduced and engine restart requests may be conducted at least in part via vehicle inertia.

6 Claims, 8 Drawing Sheets

(51) Int. Cl.
| | |
|---|---|
| *F02D 41/12* | (2006.01) |
| *F02D 13/04* | (2006.01) |
| *F01L 13/06* | (2006.01) |
| *F02D 13/02* | (2006.01) |
| *B60K 15/03* | (2006.01) |
| *B60W 10/06* | (2006.01) |
| *B60W 10/10* | (2012.01) |
| *F02M 61/14* | (2006.01) |

(52) U.S. Cl.
CPC .............. *B60W 10/10* (2013.01); *F01L 13/06* (2013.01); *F02D 13/0207* (2013.01); *F02D 13/04* (2013.01); *F02D 41/123* (2013.01); *F02M 61/14* (2013.01); *B60K 2015/03217* (2013.01); *F02D 2200/101* (2013.01)

(58) Field of Classification Search
CPC .............. F02D 35/0092; F02D 41/0002; F02D 41/0042; F02D 41/30; F02D 43/00; F02D 2700/02; F02D 2700/0225
USPC ........................... 701/103–106, 110, 112, 113
See application file for complete search history.

(56) References Cited

U.S. PATENT DOCUMENTS

| | | | | |
|---|---|---|---|---|
| 2018/0001885 | A1* | 1/2018 | Leone | B60W 20/20 |
| 2018/0344545 | A1* | 12/2018 | Khafagy | B66F 9/07572 |
| 2019/0170052 | A1* | 6/2019 | Dudar | F02D 41/047 |
| 2021/0043015 | A1* | 2/2021 | Khafagy | F02N 11/0822 |

OTHER PUBLICATIONS

Bruzek, J., "Why Jeep Replaced Our 2014 Cherokee's Engine," Cars.com Website, Available Online at https://www.cars.com/articles/why-jeep-replaced-our-2014-cherokees-engine-1420662989303/, Dec. 22, 2014, 8 pages.

"FIAT Recalls," Edmunds Website, Available Online at https://www.edmunds.com/recalls/fiat.html, Available as Early as Jan. 25, 2014, 2 pages.

"Dodge Recalls," Edmunds Website, Available Online at https://www.edmunds.com/recalls/dodge.html, Available as Early as Jan. 28, 2014, 4 pages.

Mopar, M., "Oil Consumption question," Dodge Dart Website, Available Online at https://www.dodge-dart.org/threads/oil-consumption-question.27702/page-4, Dec. 19, 2016, 9 pages.

"FIAT Ratings, Reviews and Awards," J.D. Power Website, Available Online at https://www.jdpower.com/Cars/FIAT, Available as Early as Sep. 22, 2019, 4 pages.

"Jeep Ratings, Reviews and Awards," J.D. Power Website, Available Online at https://www.jdpower.com/Cars/Jeep, Available as Early as Sep. 22, 2019, 7 pages.

"The 2020 Jeep Renegade," FCA Fleet Website, Available Online at https://www.fcausfleet.com/jeep/renegade.html, Available as Early as Jan. 2020, 5 pages.

* cited by examiner

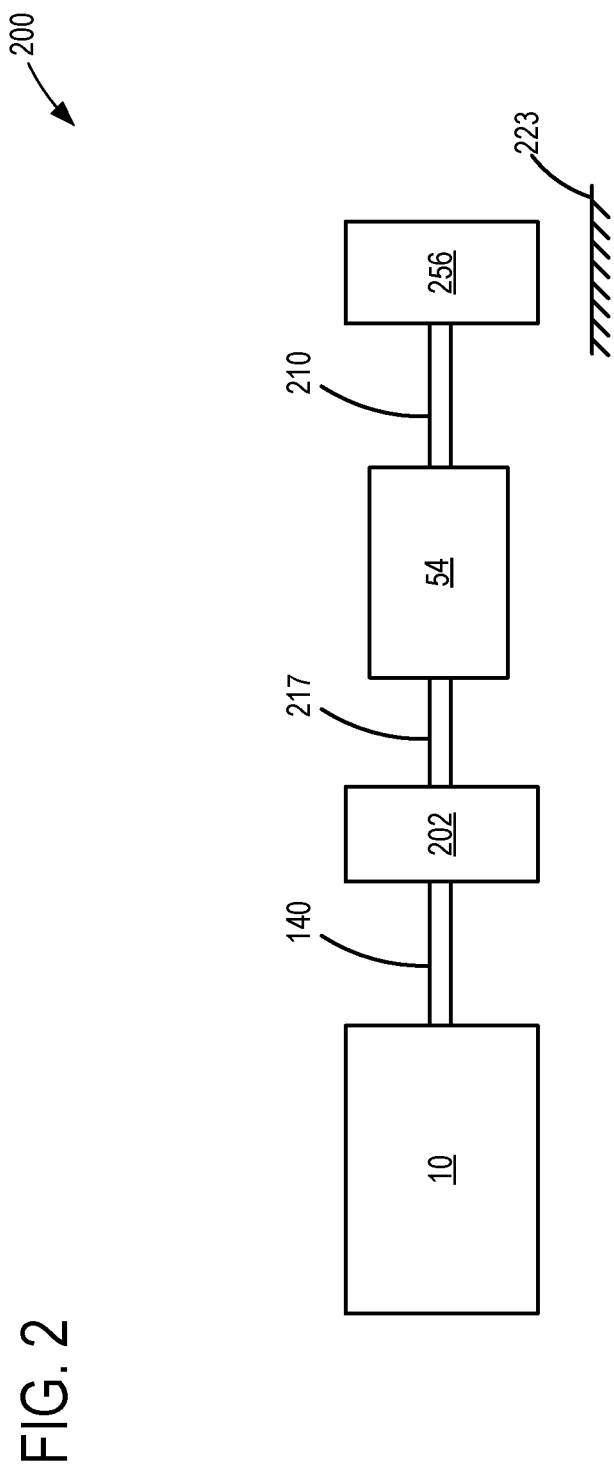

SYSTEMS AND METHODS FOR IMPROVING FUEL ECONOMY AND REDUCING EMISSIONS

FIELD

The present description relates generally to methods and systems for controlling engine intake and exhaust valve operation to improve fuel economy and reduce emissions.

BACKGROUND/SUMMARY

Vehicles with start/stop functionality may reduce fuel consumption by stopping an engine during an idle stop condition when the vehicle comes to a complete stop, and restarting the engine when conditions are met for doing so (e.g., release of a brake). Furthermore, prior to coming to a stop during a vehicle speed reduction event, fuel injection to the engine may be stopped to one or more cylinders in an operation known as fuel shut off. In some examples, during vehicle speed reduction events where fueling of the engine is shut off, fueling may be resupplied to the engine responsive to engine speed reaching an engine idle speed. However, providing fueling to the engine when engine speed reaches an engine idle speed may unnecessarily reduce fuel economy, by relying on fueling of the engine under conditions where fueling may be avoided.

The inventors have herein recognized the above-mentioned issues, and have developed systems and methods to at least partially address them. In one example, a method comprises, in response to an engine speed being within a first threshold speed of an idle speed of an engine during a speed reduction request while a set of cylinders of the engine are unfueled, maintaining the set of cylinders unfueled, and controlling the engine to a desired stopping position responsive to the engine speed being greater than a second threshold speed lower than the idle speed. The set of cylinders may comprise an entirety of cylinders of the engine. In this way, fuel economy may be improved.

As one example, controlling the engine to the desired stopping position may occur prior to the vehicle coming to a stop.

As another example, controlling the engine to the desired stopping position may further comprise decoupling the engine from a transmission of the vehicle. A gearing of the transmission may be adjusted with the engine decoupled from the transmission, as a function of vehicle speed, in some examples.

As another example, controlling the engine to the desired stopping position may include commanding or maintaining closed an intake valve for each cylinder of the set of cylinders of the engine. The method may include controlling at least one exhaust valve of at least one cylinder of the set of cylinders to generate a braking torque of the engine to control the engine to the desired stopping position. For example, controlling the at least one exhaust valve may include opening and closing the at least one exhaust valve a plurality of times during a cycle of the at least one cylinder. Furthermore, the set of cylinders may be sealed (e.g., intake and exhaust valves closed) in response to the engine speed being within the first threshold speed of the idle speed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows an example drivetrain that includes the engine of FIG. 1;

DETAILED DESCRIPTION

Figure 3A:
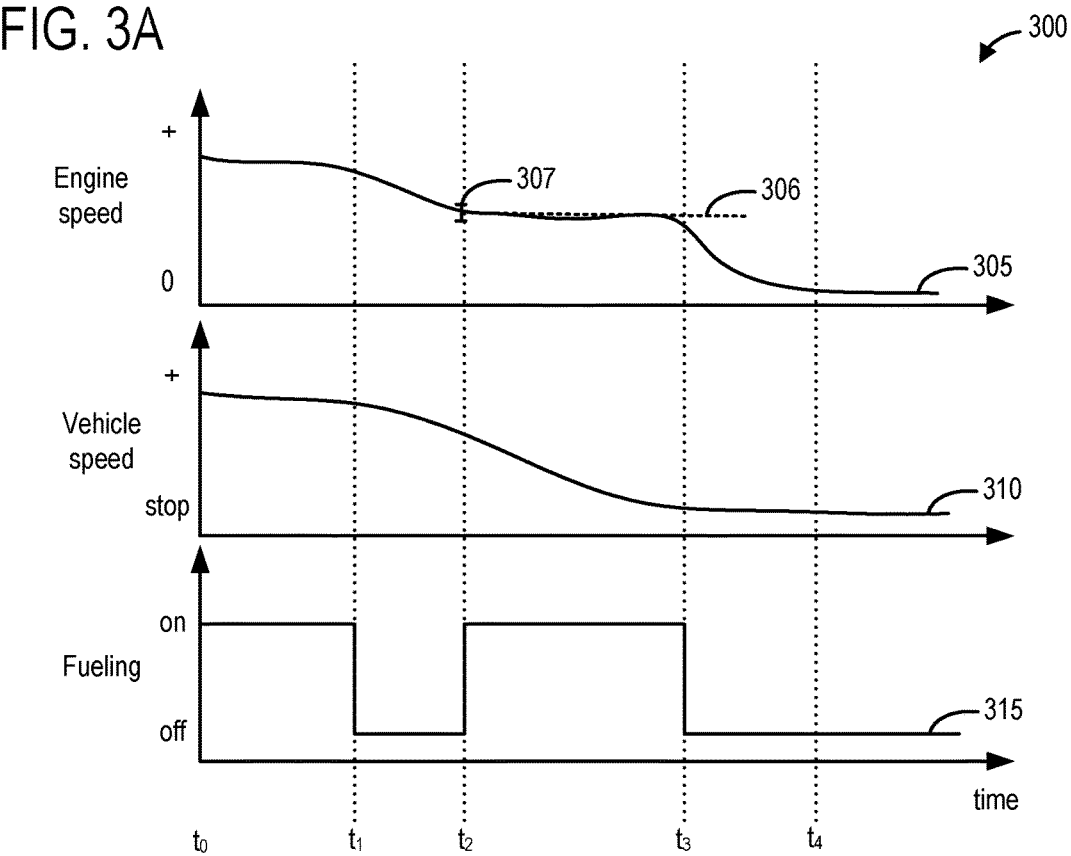
FIG. 3A depicts a prophetic example timeline for controlling engine operation during vehicle speed reduction requests.
Figure 3B:
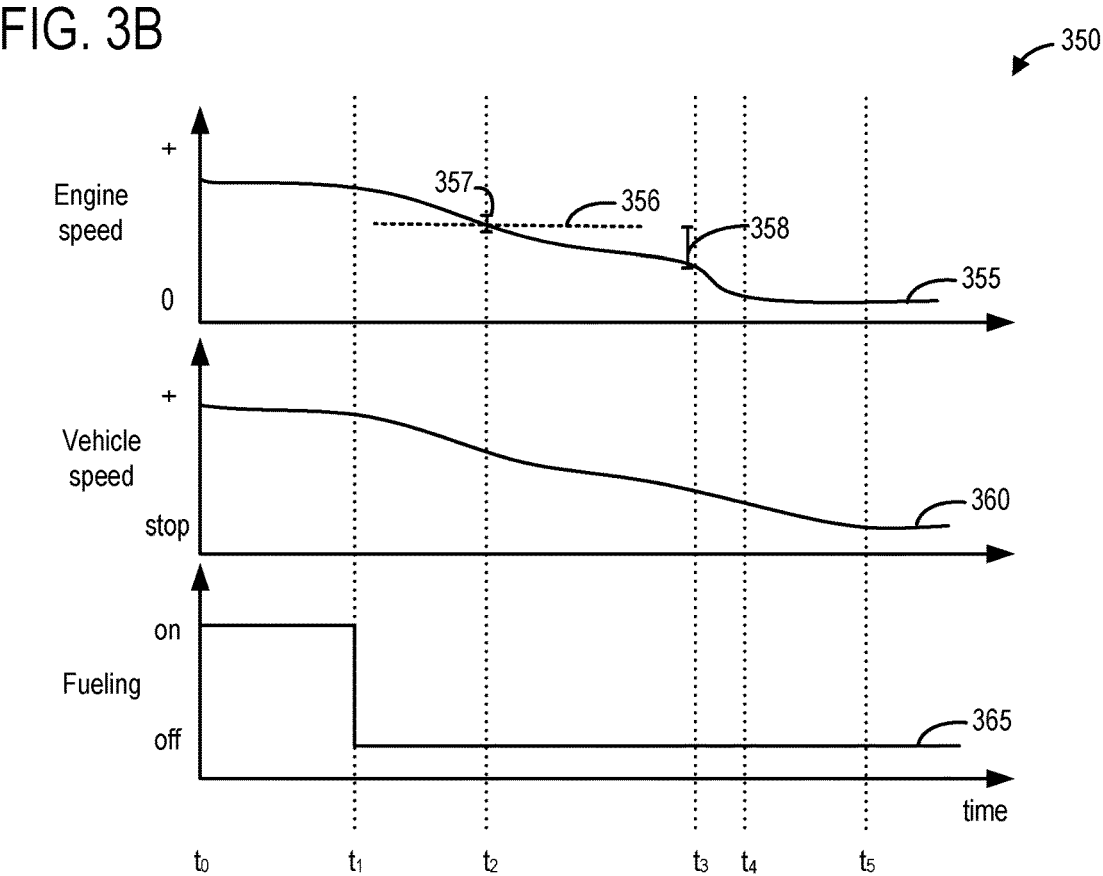
FIG. 3B depicts another prophetic example timeline for controlling engine operation during vehicle speed reduction requests according to another embodiment.
Figure 4:
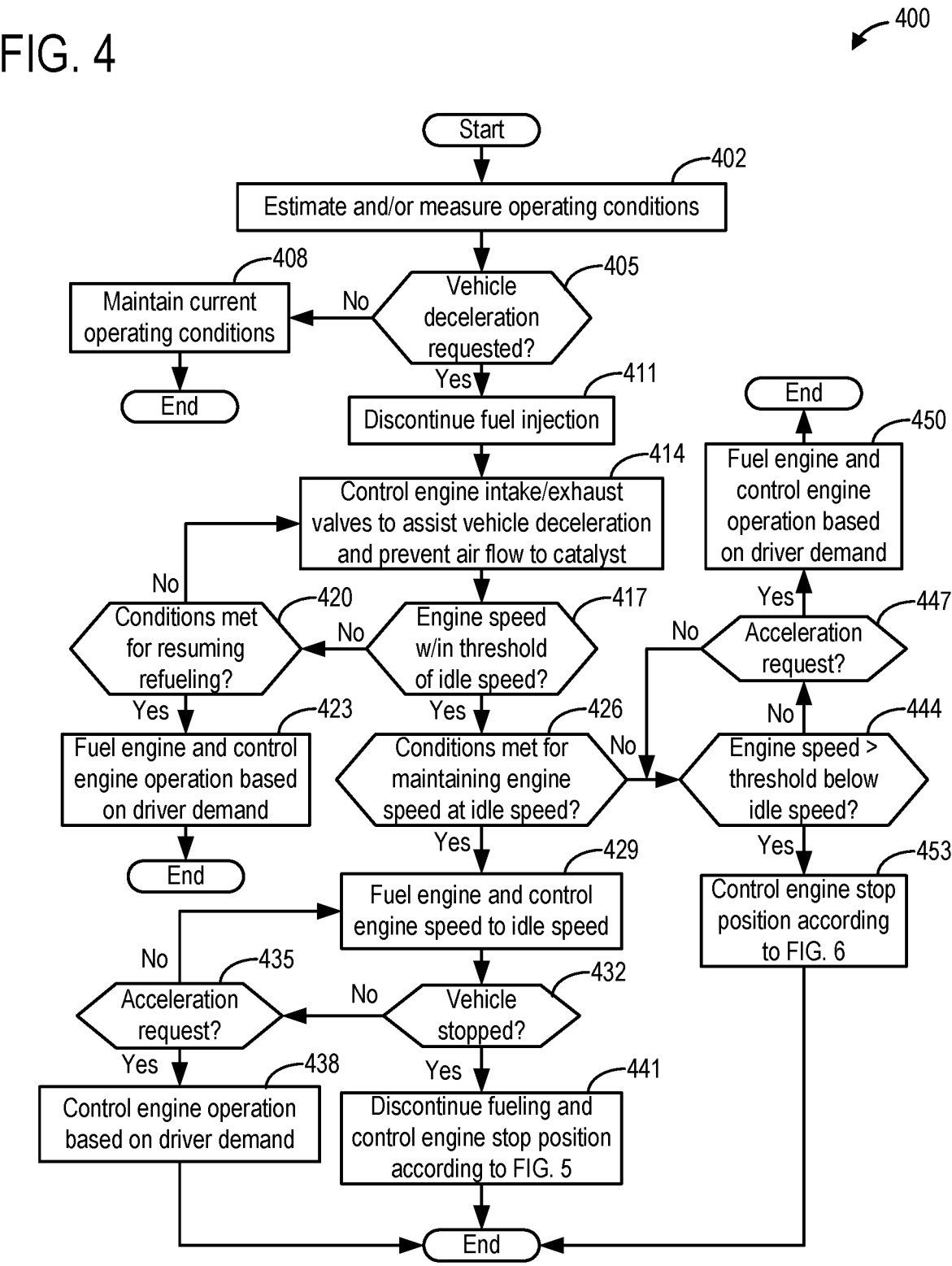
FIG. 4 depicts a high-level example method for controlling engine operation in response to vehicle speed reduction requests.
Figure 5:
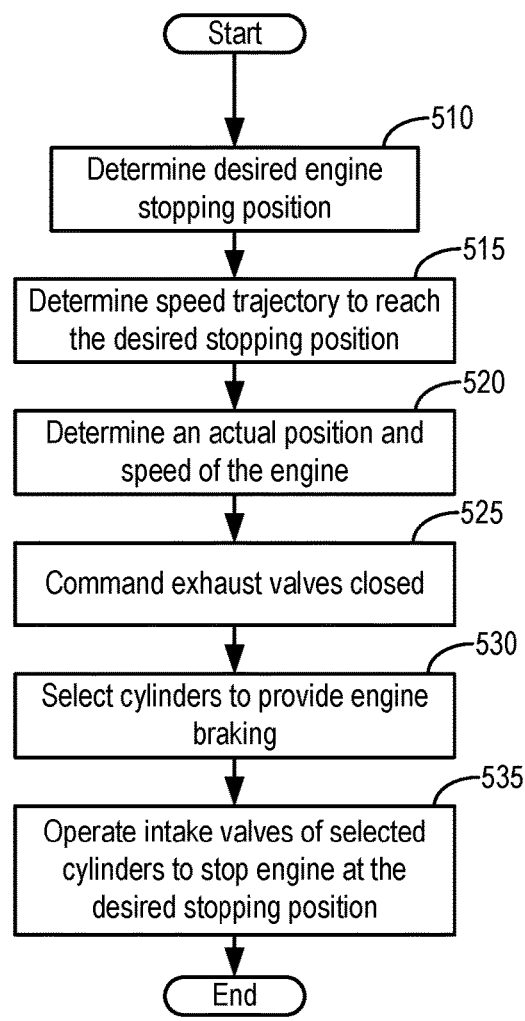
FIG. 5 depicts a high-level example method for controlling an engine shutdown routine from an engine combusting state.
Figure 6:
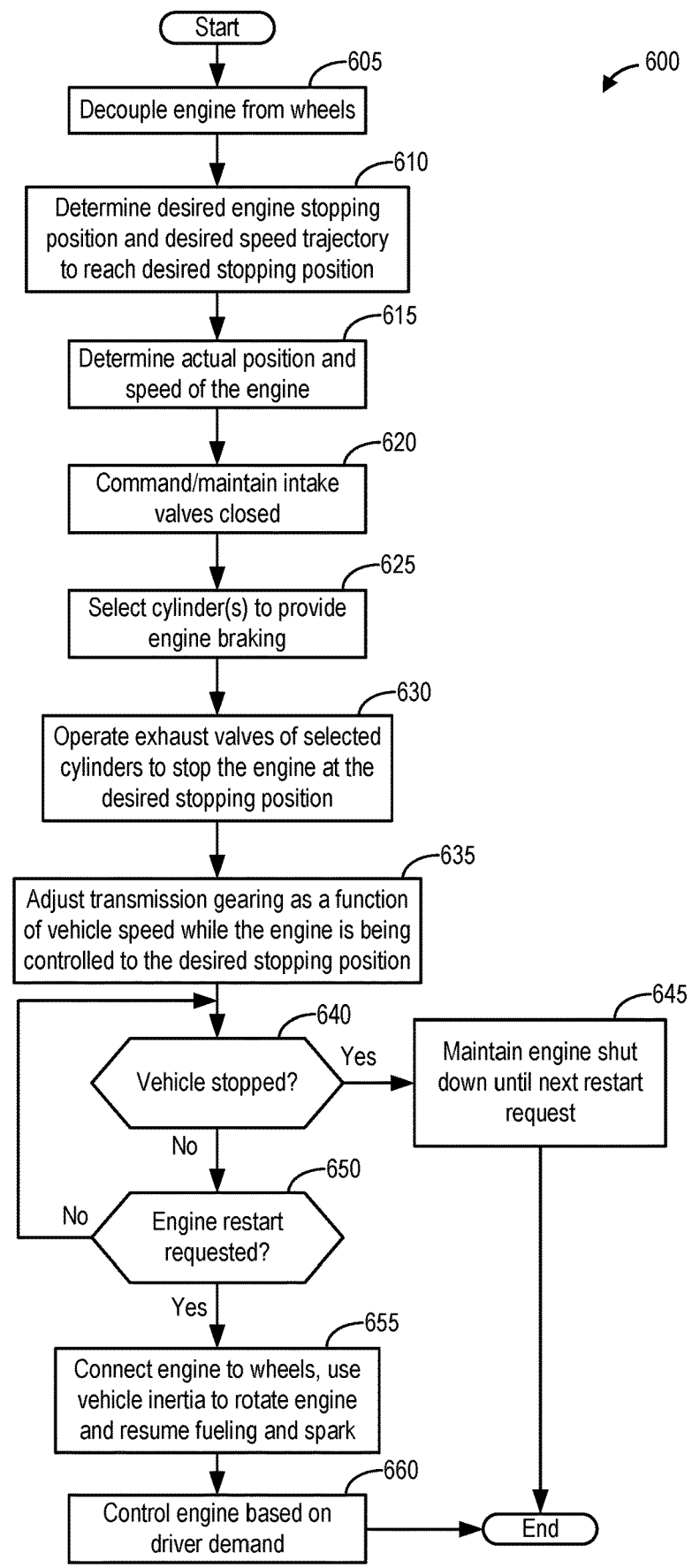
FIG. 6 depicts a high-level example method for controlling an engine shutdown routine from a non-combusting state, and for subsequently restarting the engine prior to the vehicle stopping.
Figure 7:
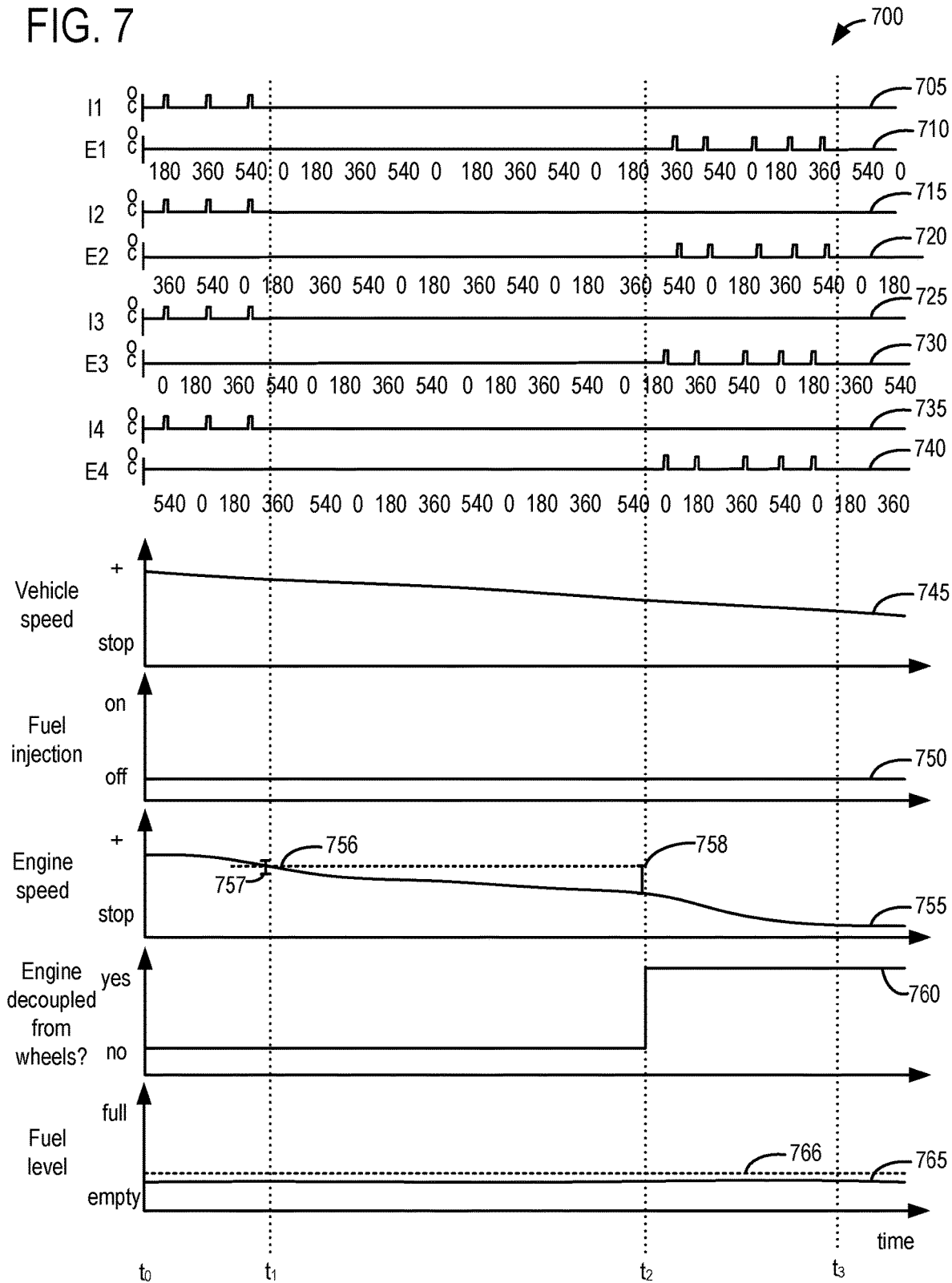
FIG. 7 depicts a prophetic example timeline for controlling an engine shutdown routine according to the methods of FIG. 4 and FIG. 6.
Figure 8:
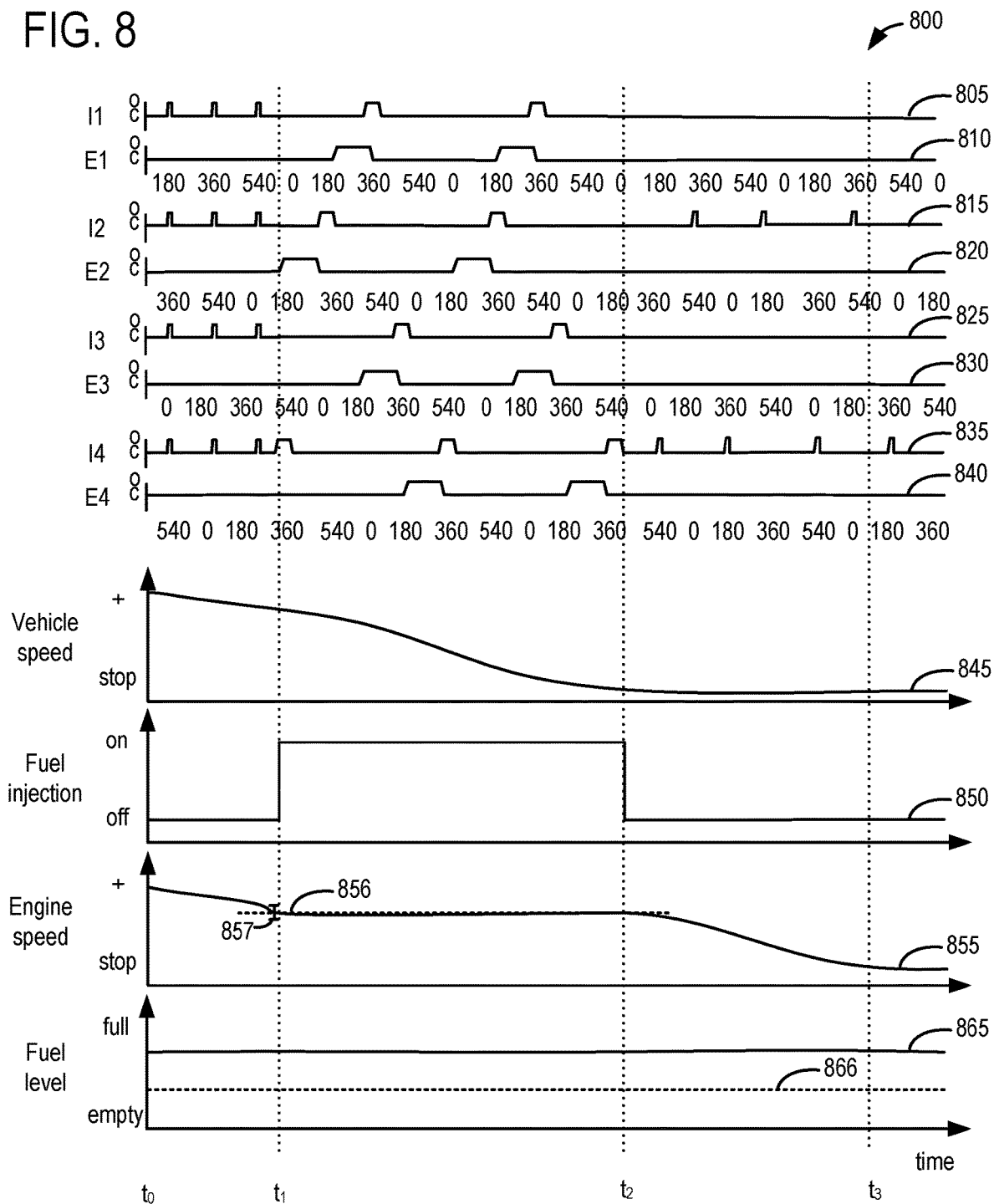
FIG. 8 depicts a prophetic example timeline for controlling intake and exhaust valves during an engine shutdown routine.

The following description relates to systems and methods for reducing vehicle emissions and improving fuel economy. The systems and methods may be applicable to vehicles that have an engine and for which intake and exhaust valve operation can selectively be controlled, such as the engine depicted at FIG. 1. As one example, the intake valve may comprise a valve for which lift and/or timing can be continuously variable, and the exhaust valve may comprise an electronically actuatable valve. As another example, the intake valve and the exhaust valve may both comprise valves for which lift and/or timing may be continuously variable. Other embodiments for valve control are within the scope of this disclosure. The systems and methods may be further applicable to vehicles that include at least a transmission selectively coupled to the engine of FIG. 1, as illustrated at FIG. 2. As discussed herein, emissions may be reduced and fuel economy improved by avoiding, where possible, the routing of air through the engine and to a catalyst during vehicle speed reduction and engine stopping routines. Furthermore, fuel economy may be improved by avoiding fueled engine idling, where possible and/or advantageous, while the vehicle is in motion, and by instead stopping the engine when conditions are met for doing so and relying at least in part on vehicle inertia for restarting the engine while the vehicle is in motion. Prophetic example timelines for how fueling of an engine may be controlled as a function of vehicle operating parameters are illustrated at FIGS. 3A-3B. Specifically, FIG. 3A depicts a scenario where the engine is fueled from an unfueled state during a vehicle speed reduction event responsive to engine speed becoming within a first threshold of an engine idle speed. FIG. 3B depicts an alternative scenario where the unfueled engine during a vehicle speed reduction event is maintained unfueled responsive to engine speed becoming within the first threshold of engine idle speed, and instead is shut down when engine speed drops to a second threshold speed below the engine idle speed while the vehicle is still in motion. FIG. 4 depicts an example method for selecting whether to control engine operation via the methodology laid out by FIG. 3A, or via the methodology of FIG. 3B. FIG. 5 depicts a method that continues from FIG. 4 and includes steps for controlling the engine to a desired stopping position from a combusting state, and FIG. 6 depicts a method that continues from FIG. 4 and includes steps for controlling the engine to a desired stopping position from a non-combusting state. A prophetic example timeline for controlling an engine stop routine via the methodology of FIG. 4 and FIG. 6, is depicted at FIG. 7. A prophetic example timeline for controlling intake and exhaust valves during engine shutdown via the method of FIG. 5 is shown in FIG. 8.

Figure 1:
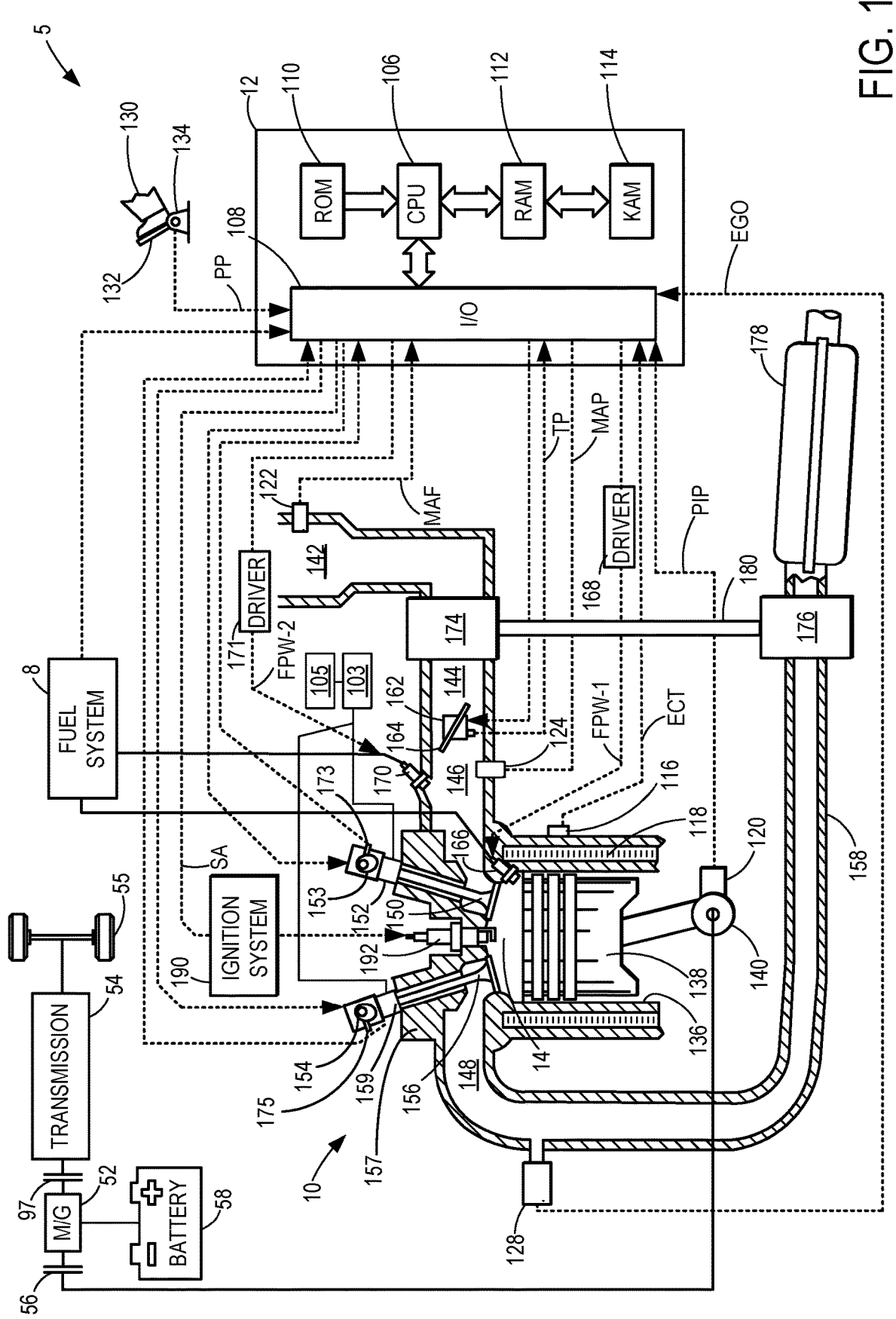
FIG. 1 shows an example of an engine system.

Turning now to FIG. 1, an example of a combustion chamber or cylinder of internal combustion engine 10 is depicted. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. The cylinder 14 is capped by cylinder head 157. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 includes one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

In the example of FIG. 1, intake valve 150 and exhaust valve 156 are actuated (e.g., opened and closed) via respective cam actuation systems 153 and 154. Cam actuation systems 153 and 154 each include one or more cams mounted on one or more camshafts and may utilize one or more of cam profile switching (CPS), variable cam timing (VCT), variable valve timing (VVT) and/or variable valve lift (VVL) systems (for example continuously variable valve lift, or CVVL) that may be operated by controller 12 to vary valve operation. In one example, actuation of variable valve timing and variable valve lift may be enabled by a first electro-hydraulic valve train 152 that leverages pressure provided by a hydraulic medium to continuously regulate lifting of the intake valve 150. The first electro-hydraulic valve train 152 may be positioned between the cam and the intake valve 150 and operate either synchronized with or independently of the cam. The first electro-hydraulic valve train 152 may include a higher pressure circuit 103 and a lower pressure circuit 105, shown in FIG. 1 coupled to cam actuation system 153 and used to control hydraulic pressure in the first electro-hydraulic valve train 152. A similar second electro-hydraulic valve train 159 may be relied upon in similar fashion for controlling actuation of variable valve timing and variable valve lift for exhaust valve 156. While depicted as cam-actuated, in other examples the intake and/or exhaust valve(s) may be electronically actuated.

The angular position of intake and exhaust camshafts may be determined by position sensors 173 and 175, respectively. In alternate embodiments, one or more additional intake valves and/or exhaust valves of cylinder 14 may be controlled via electric valve actuation. For example, cylinder 14 may include one or more additional intake valves controlled via electric valve actuation and one or more additional exhaust valves controlled via electric valve actuation.

Cylinder 14 can have a compression ratio, which is the ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 housed within cylinder head 157 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8 which may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics, such as differences in size. For example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches are engaged. In the depicted example, a first clutch 56 is provided between crankshaft 140 and electric machine 52, and a second clutch 97 is provided between electric machine 52 and transmission 54. Controller 12 may send a signal to an actuator of each clutch (e.g., first clutch 56 and/or second clutch 97) to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

As described above, FIG. 1 shows only one cylinder of multi-cylinder engine 10. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The controller 12 receives signals from the various sensors of FIG. 1 and employs the various actuators of FIG. 1 to adjust engine operation based on the received signals and instructions stored on a memory of the controller. For example, adjusting a duration of time that an intake valve 150 is maintained in a lifted position, allowing intake air to flow into the cylinder 14, may include adjusting hydraulic pressures in actuators of the first electro-hydraulic valve train 152 coupled to the intake valve 150 based on data received from the pedal position sensor 134 of the input device 132. Depression of the input device 132, when configured as an accelerator pedal, may indicate a demand for boost and valve lift and lift timing may be adjusted accordingly.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, both VVL and VVT may be enabled by an electro-hydraulic valve train that includes two or more hydraulic chambers, or reservoirs, maintained at different levels of pressure. Changes in hydraulic pressure in the electro-hydraulic valve train may actuate opening and closing of cylinder poppet valves (e.g., intake valves). The changes in hydraulic pressure are regulated by fluidly coupling or decoupling the hydraulic chambers to the poppet valves using an electrically-activated solenoid valve.

The hydraulic chambers may include a higher pressure reservoir, which may be included in the higher pressure circuit 103 of FIG. 1, and a lower pressure reservoir, which may be included in the lower pressure circuit 105 of FIG. 1. To maintain a positioning of the higher pressure reservoir proximate to the poppet valves in conventional configurations, a cavity of the higher pressure reservoir may be partially disposed in a housing for the electro-hydraulic train and partially disposed in a cylinder head of the engine, positioning the higher pressure reservoir adjacent to the poppet valves along a horizontal plane. The lower pressure reservoir may form a cavity in a base plate of the housing, adjacent to the higher pressure reservoir along the horizontal plane.

Turning to FIG. 2, example illustration 200 depicts engine 10 coupled to torque converter 202 via crankshaft 140. Torque converter 202 is also coupled to transmission 54 via turbine shaft 217. Torque converter 202 has a bypass clutch (not shown) which can be engaged, disengaged, or partially engaged. When the clutch is either disengaged or being disengaged, the torque converter is said to be in an unlocked state. Turbine shaft 217 is also known as transmission input shaft. In one embodiment, transmission 54 comprises an electronically controlled transmission with a plurality of selectable discrete gear ratios. Transmission 54 may also comprise various other gears, such as, for example, a final drive ratio (not shown). Alternatively, transmission 54 may be a continuously variable transmission (CVT).

Transmission 54 may further be coupled to wheels 55, which may include tires 256 (coupled to wheels 55 as shown at FIG. 1), via axle 210. Tires 256 interface the vehicle (not shown) to road 223. Note that in one example embodiment, this powertrain is coupled in a passenger vehicle that travels on the road. While various vehicle configurations may be used, in one example, the engine is the sole motive power source, and thus the vehicle is not a hybrid electric vehicle, plug-in hybrid electric vehicle, etc. In other embodiments, the vehicle may be a hybrid vehicle that includes an electric machine (e.g., electric machine 52 at FIG. 1).

Turning now to FIG. 3A, depicted is a prophetic example timeline 300, illustrating one example of engine control during a vehicle speed reduction event. Timeline 300 includes plot 305, indicating engine speed (e.g. RPM), over time. Timeline 300 further includes plot 310, indicating vehicle speed, over time. The vehicle may be stopped, or may be traveling at a speed greater than (+) stopped. Timeline 300 further includes plot 315, indicating fueling status (e.g., whether fuel injectors to the engine cylinders are on or off), over time.

At time t0, the vehicle is in operation with the engine being fueled. At time t1, while not explicitly illustrated, it may be understood that vehicle speed reduction is requested by an operator (e.g., human or autonomous) of the vehicle. In response to the speed reduction request, fueling to cylinders of the engine is stopped (plot 315). With fueling stopped, the controller (e.g., controller 12 at FIG. 1) may control intake and/or exhaust valve operation in a manner to assist in slowing the vehicle, while also avoiding as much as possible the flow of oxygen to the catalyst (e.g., emissions control device 178 at FIG. 1). Avoiding the flow of oxygen to the catalyst may improve fuel economy and reduce emissions. Specifically, a catalyst with excess oxygen stored throughout or within a portion of a catalyst may increase fuel consumption during a restart since additional fuel may be necessary to reset the state of the catalyst such that both oxidation and reduction may occur within the catalyst. By avoiding the flowing of oxygen to the catalyst, less fuel may be consumed at the subsequent engine restart request. As one example, any cylinders that are already deactivated (e.g., fuel injection stopped and intake and exhaust valves closed), may be maintained deactivated. With intake and exhaust valves closed for those particular cylinders, it may be understood that air flow to the catalyst may be avoided, however the deactivated cylinders may not be used for engine braking. For cylinders that are not already deactivated, intake and/or exhaust valve opening/closing timing and duration can be adjusted and/or intake or exhaust valves may be held closed. As one example, the intake valve may be held closed for particular cylinders, while the exhaust valve is maintained open. As another example, the exhaust valve may be held closed for particular cylinders, while the intake valve is maintained open.

It may be understood that the holding of one of the intake or exhaust valve closed for individual engine cylinders may serve to reduce the flow of unfueled air to the catalyst. As discussed, in some examples the other valve that is not held closed, may be maintained open. Maintaining open the other valve (e.g., exhaust valve when the intake valve is held closed) may reduce engine pumping work. However, it may be desirable in some examples to make use of compression or expansion braking to assist in vehicle speed reduction. For example, valve timing may be adjusted where the exhaust valve is held closed and the intake valve is opened near top dead center (TDC) and closed near bottom dead center (BDC) and then opened again near TDC to generate compression braking. In another example, valve timing may be adjusted where the exhaust valve is held closed and the intake valve is opened near BDC and closed near TDC and the opened again near BDC to generate expansion braking.

In some examples, rather than maintaining deactivated cylinders deactivated, such cylinders may be instead also controlled in a manner to avoid the flow of unfueled air to the catalyst, and optionally also to assist in vehicle speed reduction, in the manner discussed above.

As depicted at FIG. 3A, engine speed (plot 305) and vehicle speed (plot 310) decrease between time t1 and t2. Thus, it may be understood that between time t1 and t2 the operator has not taken an action that may result in the resuming of fueling the engine. Such action may include but is not limited to releasing a brake pedal and/or pressing down on the accelerator pedal.

At time t2, engine speed is determined to be within a threshold, indicated by line 307, of engine idle speed, represented by dashed line 306. In this example timeline, once engine speed is within the threshold of engine idle speed, fueling to the engine is resumed. Accordingly, at time t2, responsive to engine speed being within the threshold of engine idle speed, fueling to engine cylinders is resumed (plot 315). Fueling to the engine may be understood to include fueling cylinders that are not deactivated (e.g., intake and exhaust valves both closed), in some examples. In other examples, cylinders that are deactivated may be reactivated such that intake and exhaust valves operate and where fueling is provided to the cylinders.

Between time t2 and t3, engine speed is maintained at the engine idle speed (plot 306). With engine speed maintained at the engine idle speed, vehicle speed continues to decrease (plot 310). At time t3, the vehicle comes to a stop. Responsive to the vehicle coming to a stop, the engine is shut down by discontinuing fueling of the engine. Thus, it may be understood that the stop at time t3 comprises an idle-stop event where the engine is shut down to conserve fuel and thereby improve fuel economy.

It may be desirable to control a positioning of the engine to a desired stopping position at the idle stop. It may be understood that such action may include controlling the engine to the desired stop position where engine speed is 0 RPM, from engine idle speed, which may be around 600-800 RPM, for example. Controlling the stopping position of the engine to the desired stop position may be used to improve subsequent restarts in various ways. For example, when the engine is first cranked by the starter, the position of the engine may not be known for up to a full engine cycle, in some cases. This may be due to inoperability (or degraded operation) of the crank position sensor below a given engine speed (which may be dependent on ambient factors including but not limited to temperature, etc.). As an example, the given engine speed may be 100 RPM or less. However, if the stopping position can be reliably and accurately controlled (at least under some conditions), it may be used to quickly fuel and start the engine. Furthermore, it may be desirable to bring the engine to a complete stop at the desired stopping position as fast as possible, so that in the event that the operator requests increased torque from the engine, the engine can be quickly restarted to meet the request for increased torque.

Because the engine is being controlled to a desired stop position from an engine idle speed (e.g., 600-800 RPM), the following strategy may be used. First, a desired stopping position may be determined based on engine operating conditions, including but not limited to coolant temperature, ambient temperature, ambient pressure, or various other operating parameters. In this way, improved restarting can be obtained as the engine starting position will be in a range that gives improved performance for ambient conditions of the vehicle.

Next, with the desired stopping position determined, the strategy may include determining a speed trajectory to reach the desired stopping position. This determination may take into account various factors, including but not limited to coolant temperature, engine speed, gear position, etc. Further, the desired trajectory may be based on the available modes for generating braking torque, which can be influenced by the number of cylinders of the engine, and various other parameters.

With the speed trajectory determined in order to reach the desired stopping position, an actual position and speed of the engine may be determined. With the actual position and speed determined, exhaust valves corresponding to each of the engine cylinders may be commanded closed. Then, intake valves corresponding to selected engine cylinders may be controlled so as to reduce speed of the engine to 0 RPM corresponding to the desired stop position. Specifically, for selected engine cylinders, intake valves may be commanded open near TDC and closed near BDC and then opened again near TDC to generate compression braking in a manner that controls engine position to the desired stop position. Alternatively, intake valves may be commanded open near BDC, and closed near TDC and the opened again near BDC to generate expansion braking.

By relying on the above-mentioned strategy, emissions may be reduced because the amount of oxygen pumped to the catalyst during the stopping of the engine may be reduced, which may improve engine restarts. Furthermore, by controlling expansion and/or compression work, the engine stop location may be better controlled.

As illustrated at time t4 of FIG. 3A, engine speed is reduced to zero RPM by time t4, subsequent to the vehicle being stopped at time t3.

The prophetic example timeline of FIG. 3A illustrates a situation where the engine is fueled in response to engine speed being within a threshold of engine idle speed. However, it is herein recognized that it may in some examples be desirable to avoid re-fueling the engine when engine speed is within the threshold of engine idle speed, and instead allow the engine to remain unfueled as the engine speed continues to decrease in conjunction with decreasing vehicle speed. Such action may improve fuel economy by reducing an amount of fuel that is used for vehicle stopping events, as will be elaborated in greater detail below.

Turning to FIG. 3B, another prophetic example timeline 350 is shown, illustrating a vehicle speed reduction scenario where the engine is not refueled upon engine speed decreasing to within the threshold of engine idle speed, and instead is maintained unfueled until engine speed drops to a threshold amount below engine idle speed. Upon engine speed reaching the threshold amount below engine idle speed, as elaborated at FIG. 3B, the engine may be controlled to a desired stop position, even though the vehicle may not yet be stopped. The desired stop position may be a stop position that may enable an engine start in response to a sudden request for increased engine torque prior to the vehicle stopping, or after the vehicle has stopped and where increased engine torque is requested while the vehicle is stopped, as will be elaborated in greater detail below. Because the engine is being stopped from an unfueled condition, the manner in which the engine is controlled to the desired stop position may differ compared to the example above at FIG. 3A where the engine is stopped from a fueled condition.

Timeline 350 includes plot 355, indicating engine speed, over time. Engine speed may be 0 RPM, or may be rotating at a speed greater than (+) 0 RPM. Timeline 350 further includes plot 360, indicating vehicle speed, over time. The vehicle may be stopped, or may be traveling at a speed greater than (+) stopped. Timeline 350 further includes plot 365, indicating whether fueling to engine cylinders is on or off, over time.

At time t0, the vehicle is traveling (plot 360) via engine propulsion (plot 355), with the engine fueled (plot 365). At time t1, while not explicitly illustrated, it may be understood that the vehicle operator (e.g., human or autonomous) is requesting speed reduction of the vehicle. For example, the vehicle operator may release the accelerator pedal (e.g., tip-out) and/or may depress a brake pedal to request braking of the vehicle.

Responsive to the speed reduction request, fueling to engine cylinders is stopped (plot 365). In response to the fueling being stopped, vehicle speed begins to decrease (plot 360), and engine speed correspondingly begins to decrease (plot 355) between time t1 and t2.

Between time t1 and t2, similar to that discussed above, the controller may control intake and/or exhaust valve operation in a manner to assist in slowing the vehicle, while also avoiding as much as possible the flow of oxygen to the catalyst (e.g., emissions control device 178 at FIG. 1). For example, any cylinders that are already deactivated (e.g., fuel injection stopped and intake and exhaust valves closed), may be maintained deactivated. With intake and an exhaust valves closed for those particular cylinders, it may be understood that air flow to the catalyst may be avoided, as discussed above, however deactivated cylinders may not be used for engine braking. For cylinders that are not already deactivated, intake and/or exhaust valve opening/closing timing and duration can be adjusted and/or intake or exhaust valves may be held closed. As one example, the intake valve may be held closed for particular cylinders, while the exhaust valve is maintained open. As another example, the exhaust valve may be held closed for particular cylinders, while the intake valve is maintained open.

It may be understood that the holding of one of the intake or exhaust valve closed for individual engine cylinders may serve to reduce the flow of unfueled air to the catalyst. As discussed, in some examples the other valve that is not held closed, may be maintained open. Maintaining open the other valve (e.g., exhaust valve when the intake valve is held closed) may reduce engine pumping work. However, it may be desirable in some examples to make use of compression or expansion braking to assist in vehicle speed reduction. For example, as discussed above, valve timing may be adjusted where the exhaust valve is held closed and the intake valve is opened near top dead center (TDC) and closed near bottom dead center (BDC) and then opened again near TDC to generate compression braking. In another example also discussed above, valve timing may be adjusted where the exhaust valve is held closed and the intake valve is opened near BDC and closed near TDC and the opened again near BDC to generated expansion braking.

At time t2, engine speed comes within the threshold (represented by line 357) of engine idle speed (represented by dashed line 356). It may be understood that the threshold represented by line 357 may comprise the same threshold as the threshold represented by line 307 at FIG. 3A, and engine idle speed represented by dashed line 356 may be the same as the engine idle speed represented by dashed line 306 at FIG. 3A. However, in this example, instead of fueling to the engine being resumed in response to engine speed coming within the threshold of engine idle speed, fueling to the engine is maintained off. As discussed above, by not fueling the engine when engine speed is within the threshold of engine idle speed, fuel economy may be improved.

While not explicitly illustrated, but which will be elaborated in further detail below, in some examples it may be desirable to command or control intake and exhaust valves closed for any cylinders for which the intake and exhaust valves are not already controlled to be closed. This may reduce engine pumping losses, which may be desirable in case of a change of mind event where the vehicle operator requests increased engine torque to propel the vehicle. In other words, instead of compression and/or expansion braking being utilized in response to engine speed dropping below engine idle speed, engine cylinders may be sealed, thereby reducing engine pumping losses such that in a case where the operator requests increased engine torque, the engine may be rotating at a speed to readily enable fueling and spark to drive the engine into a combusting mode of operation without assistance from a starter motor, for example. Thus, it may be understood that between time t2 and t3, engine cylinders may be sealed, with engine cylinders acting as air springs. Operating the engine in this manner may improve the ability of the vehicle to coast, by avoiding engine braking.

At time t3, engine speed has dropped to a threshold amount (represented by line 358) below engine idle speed. The threshold amount represented by line 358 may be understood to be a greater amount below engine idle speed than that defined by the threshold represented by line 357. The threshold amount may be an adjustable amount in some examples. In one example, the threshold amount may be adjustable based on operator driving habits, learned over time via the controller of the vehicle. As another example, the threshold amount may be adjusted as a function of vehicle speed. For example, the threshold may be increased as vehicle speed increases and decreased as vehicle speed decreases. Alternatively, the threshold may be decreased as vehicle speed increases and increased as vehicle speed decreases. As another example, the threshold amount may be adjusted based on a level of fuel in the fuel tank of the vehicle. For example, the threshold amount may be increased as fuel level in the fuel tank decreases, and decreased as fuel level in the fuel tank increases. As another example, the threshold amount may be adjusted based on a state of charge of the battery. For example, the threshold amount may be increased as battery SOC decreases, and decreased as battery SOC increases. Alternatively, the threshold amount may be decreased as battery SOC decreases, and increased as battery SOC increases.

In some examples, adjusting the threshold may be conducted via the controller in response to engine speed coming within the threshold of engine idle speed (refer above to time t2 at FIG. 3B).

At time t3, engine speed has dropped to the threshold amount below engine idle speed, prior to the vehicle stopping. In response to engine speed dropping to the threshold amount below engine idle speed, the controller may command an engine shutdown routine. However, the engine shutdown routine may differ from the engine shutdown routine discussed above at FIG. 3A (refer to the timeframe between time t3 and t4), as elaborated in further detail below.

Specifically, the routine may first operate the transmission and/or torque converter to decouple the engine from the driving torque of the wheels. As one example, the forward clutch of the transmission may be disengaged to maintain the transmission in gear, but to decouple the engine from the wheels to enable the engine to be controlled to a desired stopping position. As another example, the transmission may be shifted into neutral or a gear with an over-running clutch to de-couple the engine from the driving torque of the wheels to enable the engine to be controlled to a desired stopping position while the vehicle is still traveling.

With the engine de-coupled from the driving torque of the wheels, the engine may be controlled to a desired stop position from the engine speed that is the threshold amount below engine idle speed. Similar to that discussed above, a desired stopping position may first be determined based on engine operating conditions, including but not limited to coolant temperature, ambient temperature, ambient pressure, or various other operating parameters. Then, a speed trajectory may be determined for reaching the desired stopping position. The determination may take into account various factors, including but not limited to coolant temperature, engine speed, gear position, etc., and may be based on available modes for generating braking torque, which may be influenced by the number of cylinders of the engine, and various other parameters.

Next, an actual position and speed of the engine may be determined. As discussed above, all engine cylinders may be sealed, and thus the routine for controlling the engine to the stop position may include maintaining (or in other examples commanding) the intake valves for all cylinders closed. Then, exhaust valves corresponding to a selected cylinder may be controlled so as to reduce speed of the engine to 0 RPM corresponding to the desired position. Because the engine is stopping while the vehicle is in motion, it may be desirable to stop the engine at the desired position as rapidly as possible. Thus, a plurality of cylinders may be selected for reducing the speed of the engine to 0 RPM, more specifically, an entirety of cylinders may be selected for reducing the speed of the engine to 0 RPM. For the selected cylinders, the exhaust valve may be commanded open near TDC, closed near BDC, and opened again near TDC to generate compression braking in a manner that controls engine position to the desired stop position. Alternatively, exhaust valves may be commanded open near BDC, closed near TDC, and then opened again near BDC to generate expansion braking. By commanding or maintaining the intake valves closed, air flow to the catalyst may be prevented, which may improve emissions. In still other examples, exhaust valves may be quickly commanded open and then closed near TDC and BDC as the engine cycles.

In another embodiment, it is herein recognized that because the engine is spinning at a lower speed when commanded to be stopped for the routine described with regard to FIG. 3B, as compared to the routine described with regard to FIG. 3A, it may not be as imperative to impede the flow of oxygen to the catalyst, due to the lesser overall amount of oxygen that may be routed to the catalyst when relying on the routine of FIG. 3B as compared to that of FIG. 3A. Specifically, an overall amount of engine rotation that may occur when stopping the engine from engine idle speed in a combusting mode (refer to FIG. 3A) may be greater than that which may occur when stopping the engine from a speed that is more than the threshold amount (refer to line 358 at FIG. 3B) lower than engine idle speed and where the engine is already in a non-combusting mode (refer to FIG. 3B). Accordingly, it may be understood that in some examples, controlling the engine to a desired stopping location may take priority over reducing the flow of air to the catalyst. In other words, the controller may, based on the speed trajectory determined for reaching the desired stopping position, ascertain whether the desired stopping position may be more advantageously achieved by controlling engine intake and/or exhaust valves in a manner that does not prioritize the reduction of air flow to the catalyst. In such an example, both intake and exhaust valves may be controlled in a manner that results in the desired stopping being achieved, even if the result allows a small amount of air flow to the catalyst.

The engine stopping routine of FIG. 3B may include further steps. Specifically, the engine stopping routine may include adjustments to the transmission to place the transmission in a state that may improve engine restarts. As an example where the transmission can be shifted while the engine is stopped (e.g., via hydraulic pressure generated by an electrically driven pump), a gear of the transmission may be controlled during vehicle speed reduction, such that in the event that an engine restart is requested (prior to the vehicle stopping), the transmission may be in a desired gear for enabling a transfer of torque from the wheels to the engine by way of the transmission, thereby providing the engine rotation needed to start the engine. By way of example, with the engine stopped, the transmission may be first shifted to a fourth gear as vehicle speed drops to a first speed, then to a third gear as vehicle speed drops further to a second, lower speed, then to a second gear as vehicle speed drops further to a third, even lower speed, and then to a first gear as vehicle speed drops to a fourth yet further lower speed. In this way, responsive to a request for increased engine torque to propel the vehicle, the forward clutch may be engaged and fueling and spark resumed to restart the engine relying on vehicle inertia. In some examples where vehicle speed is below a restart threshold, then it may be possible to rely on the starter motor to assist the starting of the engine.

In a different example, if the transmission is not shifted while the engine is stopped, it may be possible to shift the transmission to a desired gear for restarting during or prior to the engine shutdown. As an example, responsive to a transition from a DFSO condition to an engine shutdown, such as that which occurs at time t3 of FIG. 3B, the forward clutch may be disabled to de-couple the engine from the wheels (such that the engine can be controlled to the desired stopping position), while at the same time the transmission may be shifted to a desired gear or gears in the manner described above. Then, in response to a request for increased engine torque, the forward clutch may be engaged to utilize vehicle inertia to at least partially spin up the engine so that the engine may be restarted by resuming fueling and spark to engine cylinders.

Thus, the timeline of FIG. 3B illustrates an engine stopping routine that takes place between time t3 and t4. As illustrated, the engine comes to a stop at the desired stopping position (plot 355) at time t4, while the vehicle is still in motion (plot 360). At time t5, the vehicle comes to a stop, without a request to restart the engine being received at the controller. Thus, the timeline of FIG. 3B does not specifically show a restart of the engine, but it may be understood that between time t4 and t5, in response to a request for increased engine torque, the engine may be reconnected to the transmission as discussed above, such that vehicle inertia may be used, at least in part, to restart the engine. By relying on vehicle inertia to at least partially restart the engine, fuel economy may be further improved, by reducing or avoiding the use of battery power to restart the engine.

Thus, the timelines of FIG. 3A and FIG. 3B above depict two different scenarios for controlling an engine of a vehicle to a desired stop position. The strategy of FIG. 3A may be used in some examples, whereas the strategy of FIG. 3B may be used in other examples. Specifically, in one example, the strategy of FIG. 3A may be relied upon if fuel level in a fuel tank of the vehicle is greater than a predetermined threshold fuel level, whereas the strategy of FIG. 3B may be relied upon if fuel level in the fuel tank is lower than the predetermined threshold fuel level. Additionally or alternatively, the selection may be dependent on battery state of charge (SOC) and whether accessory loads (e.g., air conditioning, etc.) are being used. For example, in a situation where there are demands for accessory loads on the engine, and where it is determined that it is either undesirable to rely on the battery (e.g., for fuel economy considerations) for powering the accessory loads and/or if it is determined that the battery cannot reliably power the accessory loads due to a current SOC of the battery, then in response to engine speed becoming within the threshold of engine idle speed, the strategy of FIG. 3A may be used where the engine fueling is resumed. Alternatively, in a case where it is determined that the battery can reliably meet the demands of the accessory loads (e.g., battery SOC above a predetermined threshold) without compromising future engine restarts that may have to rely on the battery, or other conditions that may require the battery, then the strategy of FIG. 3B may be relied upon.

Additionally or alternatively, the strategy of FIG. 3B may be prioritized over the strategy of FIG. 3A, where possible, provided that an operator of the vehicle selects an environmentally friendly mode of operation, for example via a human machine interface (HMI) included in the vehicle (e.g., associated with the vehicle dash), or via a personal computing device (e.g., smartphone, laptop, tablet, etc.) that can communicate (e.g., via wireless transmission) with the controller of the vehicle. For example, in response to the vehicle operator selecting the environmentally friendly mode, then where possible, the controller may prioritize the strategy of FIG. 3B over that of FIG. 3A, such that fuel economy may be improved, and emissions reduced.

Thus, based on the above, it may be understood that the strategy of FIG. 3A may in some examples be employed under control of the controller of the vehicle, whereas in other examples the strategy of FIG. 3B may be employed.

Turning now to FIG. 4, a high-level example method 400 depicts control strategy for selecting whether to control an engine stop via the routine discussed with regard to FIG. 3A, or that discussed with regard to FIG. 3B. Method 400 will be described with reference to the systems described herein and shown in FIGS. 1-2, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the vehicle system, such as the sensors described above with reference to FIG. 1. The controller may employ vehicle system actuators such as first electro-hydraulic valve train (e.g., first electro-hydraulic valve train 152 at FIG. 1), second electro-hydraulic valve train (e.g., second electro-hydraulic valve train 159 at FIG. 1), high pressure circuit (e.g., high pressure circuit 103 at FIG. 1), lower pressure circuit (e.g., lower pressure circuit 105 at FIG. 1), fuel injector(s) (e.g., fuel injector 166 and/or fuel injector 170 at FIG. 1), spark plug(s) (e.g., spark plug 192 at FIG. 1), etc., to alter states of devices in the physical world according to the methods depicted below.

Method 400 begins at 402, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 405, method 400 includes indicating whether vehicle speed reduction is being requested by the operator of the vehicle. The request may include the operator releasing an accelerator pedal, depressing a brake pedal, etc. If vehicle speed reduction is not being requested at 405, then method 400 proceeds to 408. At 408, method 400 includes maintaining current operating conditions. For example, the engine may be continued to operate with fueling and spark provided to engine cylinders. Method 400 may then end. While depicted as ending, it may be understood that the controller may continually assess whether vehicle speed reduction is requested during a drive cycle.

Returning to 405, in response to a vehicle speed reduction request being received at the controller, method 400 proceeds to 411. At 411, method 400 includes discontinuing fuel injection to engine cylinders. In some examples, fueling may have already been discontinued for one or more cylinders of the engine in order to improve fuel economy, where intake and exhaust valves are controlled to be closed, and in such a case, the status of those cylinders may be maintained as deactivated. Fueling to remaining cylinders (or all cylinders if none are already deactivated) may be discontinued at 411.

Proceeding to 414, method 400 includes controlling engine intake and/or exhaust valves to assist vehicle speed reduction (where applicable), while also preventing a flow of air to the catalyst while the engine is rotating unfueled, as discussed in detail above with regard to FIGS. 3A-3B.

Continuing to 417, method 400 judges whether engine speed is within the threshold of engine idle speed, as discussed with regard to FIGS. 3A-3B. If engine speed has not yet decreased to within the threshold of engine idle speed, then method 400 proceeds to 420. At 420, method 400 includes indicating whether conditions are met for resuming refueling of the engine. Conditions being met for resuming refueling may include a request for increased engine torque to propel the vehicle, release of a brake pedal, etc. If such conditions are not met for resuming refueling, then method 400 returns to 414, where the engine intake and/or exhaust valves are continued to be controlled to reduce air flow to the exhaust catalyst and to assist vehicle braking, if applicable. Alternatively, in response to conditions being met for refueling the engine, then method 400 proceeds to 423. At 423, method 400 includes resuming refueling of the engine, and controlling engine operation based on driver demand. In some examples where one or more cylinders are deactivated (e.g., intake and exhaust valves closed), those cylinders may be maintained deactivated in some examples, or in other examples fueling and intake/exhaust valve operation may be resumed. Method 400 may then end.

Returning to 417, in response to engine speed decreasing to within the threshold of engine idle speed, method 400 proceeds to 426. At 426, method 400 includes indicating whether conditions are met for maintaining engine speed at the engine idle speed. As discussed above with regard to FIGS. 3A-3B, in some examples conditions may be met for maintaining engine speed at the engine idle speed in response to fuel level being greater than the predetermined threshold fuel level. Additionally or alternatively, conditions may be met for maintaining engine speed at the engine idle speed in response to the vehicle operator having not requested operation in the environmentally friendly mode. Additionally or alternatively, conditions may be met for maintaining engine speed at the engine idle speed in response to a request for powering of accessory loads, where it is determined that it is not desirable to power the accessory loads via battery power alone. It may be understood that other aspects of vehicle operation may additionally or alternatively be taken into account when determining whether conditions are met for maintaining engine speed at the engine idle speed. For example, if coolant temperature is below a coolant temperature threshold, then conditions may be met for maintaining engine speed at engine idle speed.

If, at 426, it is determined that conditions are met for maintaining engine speed at the engine idle speed, then method 400 proceeds to 429. At 429, method 400 includes resuming fueling to engine cylinders, and controlling engine speed to engine idle speed. It may be understood that controlling engine speed to engine idle speed may controlling fuel injection pulse width, fuel injection timing, intake/exhaust valve timing and/or lift, etc., to maintain engine speed within the threshold of engine idle speed. It may be understood that in a case where one or more engine cylinders are deactivated (e.g., intake and exhaust valves closed, fueling discontinued), then it may be possible to control engine speed to the engine idle speed while maintaining those cylinders deactivated, in some examples. However, in other examples, any deactivated cylinders may be reactivated (e.g., fueling resumed, intake/exhaust valve operation resumed) at 429, to control engine speed to the engine idle speed.

Proceeding to 432, method 400 includes indicating whether the vehicle has come to a stop while the engine is controlled to engine idle speed. If not, then method 400 proceeds to 435. At 435, method 400 includes indicating whether there is an acceleration request, or in other words, a request for increased engine torque. If not, then method 400 returns to 429, where the engine is continued to be controlled to the engine idle speed. Alternatively, responsive to the controller receiving a request to increase engine torque, then method 400 proceeds to 438. At 438, method 400 includes controlling engine operation based on driver demand. In other words, because the engine is already fueled, the engine may simply be controlled based on the demand by the operator for increased engine torque. In some examples where any cylinders are deactivated, those cylinders may be reactivated, or may not, depending on the operator demanded torque request. Method 400 then ends. While depicted as ending, it may be understood that method 400 may again be used in response to further speed reduction requests during the drive cycle.

Returning to 432, in response to an indication that the vehicle has come to a stop while the engine is being controlled to the engine idle speed, method 400 proceeds to 441. At 441, method 400 includes discontinuing fueling the engine (and discontinuing the providing of spark), and controlling the engine stop position according to the method of FIG. 5 as discussed below, and as discussed above with regard to FIG. 3A. Method 400 may then end.

Returning to 426, responsive to engine speed becoming within the threshold of engine idle speed, and further responsive to conditions not being met for maintaining engine speed at the engine idle speed, method 400 includes maintaining engine cylinders unfueled. While not explicitly illustrated, as discussed above with regard to FIG. 3B, in some examples, responsive to engine speed becoming within the threshold of engine idle speed, all cylinders of the engine may be deactivated. For example, because the engine cylinders are already unfueled, deactivating the cylinders may include commanding closed intake and exhaust valves, so that the engine cylinders operate as air springs. This may lower engine pumping work, while additionally preventing the flow of air to the catalyst. The lowered pumping work may enable the engine to rotate in a manner that may enable the engine to enter into a combusting mode of operation by simply providing fueling in response to a request for increased engine torque, without additionally controlling transmission gearing, relying on a starter motor to rotate the engine in response to a request for increased engine torque, etc. In other words, reducing pumping work when engine speed decreases to within the threshold of engine idle speed may be advantageous in that the engine may be spinning in a manner than enables a smooth restart in response to a request for increased engine torque. Furthermore, the reduction in pumping work may improve coasting.

At 444, method 400 judges whether engine speed has decreased to the threshold amount below engine idle speed. If not, method 400 proceeds to 447, where it is determined whether the operator is requesting vehicle acceleration, or in other words, increased engine torque. If not, then method 400 includes continuing to maintain the engine unfueled, and in some examples, with all cylinders deactivated (e.g., intake and exhaust valves closed). In other examples, the controller may infer that additional engine braking may be requested, and in such an example, the controller may control intake and/or exhaust valves in a manner that enables increased engine braking while also avoiding air flow to the catalyst. As an example, exhaust valves for engine cylinder(s) selected to provide braking may be closed, while intake valve(s) may be controlled as discussed above with regard to FIGS. 3A-3B, to increase engine braking.

If, at 447, it is determined that increased engine torque is requested, then method 400 proceeds to 450. At 450, method 400 includes fueling the engine, and controlling engine operation based on driver demand. Specifically, it may be understood that in a situation where engine speed has not decreased to the threshold amount below engine idle speed, engine rotational speed may be such that a combusting mode of operation may be resumed, simply by resuming fueling to engine cylinders. It may be understood, of course, that in a case where engine cylinders (e.g., all, or a fraction of all engine cylinders) have intake/exhaust valves closed, intake/exhaust valve operation may be resumed at least for a fraction of deactivated cylinders, such that the engine may resume the combustion mode of operation. Method 400 may then end.

Returning to 444, in response to engine speed decreasing to the threshold amount below engine idle speed, method 400 proceeds to 453. At 453, method 400 includes controlling engine stop position in a manner according to the method of FIG. 6, and as discussed above with regard to FIG. 3B.

Turning now to FIG. 5, a high-level example method 500 is shown, illustrating how a stopping position of an engine may be controlled from a combusting state of operation. Method 500 continues from FIG. 4, and thus it may be understood that method 500 is described with reference to the systems described herein and shown in FIGS. 1-2, and that method 500 is carried out by the controller (e.g., controller 12 at FIG. 1) and may be stored at the controller as executable instructions in non-transitory memory.

Instructions for carrying out method 500 may be executed by the controller based on instructions stored on a memory of the controller and in conjunction with signals received from sensors of the vehicle system (e.g., sensors of FIG. 1). The controller may employ actuators to alter states of devices in the physical world according to method 500 described below.

Method 500 begins at 510, and includes determining a desired engine stopping position. The desired stopping position may be based on engine operating conditions (e.g., coolant temperature, ambient temperature, ambient pressure, etc.). The desired stopping position may in some examples be a position where at a subsequent restart, the engine is expected to just be reaching a minimum speed for reliable engine speed sensor operation just prior to a missing tooth on the crankshaft, so that the controller may quickly ascertain engine position at the subsequent engine start. In some examples, the desired stop position may be determined via a lookup table or tables, based on vehicle parameters and/or ambient conditions. For example, the desired stop position may be a function of fuel level, fuel type, fuel RVP, engine temperature, coolant temperature, ambient temperature, etc.

Continuing to 515, method 500 includes determining a speed trajectory of the engine to reach the desired stopping position. Determining the speed trajectory may include accounting for various factors including but not limited to coolant temperature, engine speed, gear position, etc. The speed trajectory may be based on the available mode for generating engine braking torque. In this example method, as discussed above with regard to FIG. 3A, the available mode for generating engine braking torque may include controlling intake valve lift for selected cylinders, while maintaining exhaust valves closed on all engine cylinders to avoid the routing of air to the catalyst during the process of stopping the engine. Thus, determining the speed trajectory may take into account the preferred method of controlling engine braking that in this example includes controlling intake valve lift for selected cylinders while maintaining exhaust valves closed on all cylinders.

Proceeding to 520, actual position and speed of the engine is determined. For example, actual speed and position may be determined based on the sensor (e.g., Hall effect sensor 120 at FIG. 1) coupled to the crankshaft. With engine position and speed determined, exhaust valves for all cylinders that are not already closed, are controlled closed at 525. In an example where the exhaust valves include an electro-hydraulic valve train (e.g., second electro-hydraulic valve train 159 at FIG. 1) to vary exhaust valve lift, then the exhaust valves may be controlled to zero lift (e.g., closed). In other examples it may be understood that the exhaust valves may be electronically actuatable, and in such a case the exhaust valves may be actuated closed. Other examples of valve control are within the scope of this disclosure.

Proceeding to 530, method 500 includes selecting engine cylinders to provide the braking torque to control the engine to the desired stopping position, based on the speed trajectory determined at step 515 of method 500. In one example, a plurality of engine cylinders, but not an entirety of the engine cylinders, may be selected to provide the braking torque, to rapidly stop the engine at the desired stopping position. Continuing to 535, method 500 includes controlling the intake valve(s) of the selected cylinder(s) in a manner that controls engine position to the desired stop position. As one example, intake valve(s) for selected cylinder(s) may be controlled to generate compression braking. As another example, intake valve(s) may be controlled to generate expansion braking. In yet another example where at least two cylinders are selected, some combination of compression braking and expansion braking may be relied upon, such that the engine is controlled to the desired stopping position. For example, one cylinder may be controlled for compression braking while another cylinder may be controlled for expansion braking. In doing so, the engine may be controlled to the desired stopping position in a faster manner than if just compression braking, or just expansion braking were relied upon. In some examples, intake valve lift amount may be controlled at times when the intake valves are controlled to be at least partially open, for controlling the amount of compression braking or expansion braking. For example, with regard to compression braking where the intake valve is commanded open near TDC, closed near BDC and opened again near TDC, varying an amount of valve lift when the valve is commanded open may enable a varying amount of compression braking, as opposed to a situation where the intake valve were simply commanded fully open. For example, lesser valve lift may relieve less compression pressure, thereby lessening the amount by which the engine is slowed, as compared to greater valve lift where more compression pressure is relived. The varying of the valve lift amount may be used in some examples to control the engine to the desired stop position as a function of the desired speed trajectory. Similarly, controlling intake valve lift amount may enable precise control over expansion braking, which may enable the engine to be controlled to the desired stop position while satisfying the requirements of the desired speed trajectory. Method 500 may end responsive to the engine being stopped in the desired position.

Turning now to FIG. 6, a high-level example method 600 is shown, illustrating how a stopping position of the engine may be controlled from a non-combusting state of engine operation, and where the engine is rotating at a speed that is the threshold amount (refer to line 358 at FIG. 3B) or more below engine idle speed. Method 600 continues from FIG. 4, and thus it may be understood that method 600 is described with reference to the systems described herein and shown in FIGS. 1-2, and that method 600 is carried out by the controller (e.g., controller 12 at FIG. 1) and may be stored as executable instructions in non-transitory memory. Instructions for carrying out method 600 may be executed by the controller based on instructions stored on a memory of the controller and in conjunction with signals received from sensors of the vehicle system (e.g., sensors of FIG. 1). The controller may employ actuators to alter states of devices in the physical world according to method 600 described below.

Method 600 begins at 605, and includes decoupling the engine from wheels of the vehicle. Specifically, at 605, method 600 may include operating the transmission and/or torque converter in a manner to decouple the engine from the driving torque of the wheels. As discussed above, the forward clutch of the transmission may be disengaged to maintain the transmission in gear, but decouple the engine from the wheels. In another example, the transmission may be shifted into neutral or a gear with an over-running clutch to decouple the engine from the driving torque of the wheels.

The method then proceeds to 610, where desired stopping position is determined based on one or more of engine operating conditions (e.g., coolant temperature, fuel level, fuel type, fuel RVP, ambient temperature, ambient pressure, etc.), positioning such that the controller may quickly ascertain engine position at a subsequent engine start, and positioning that may readily enable an engine start event that relies on vehicle inertia under circumstances where the engine is stopped but where an engine restart is requested prior to the vehicle coming to a stop. In some examples, the desired stop position may be determined via a lookup table or tables, based on one or more of the above mentioned vehicle parameters and/or ambient conditions. At 610, method 600 further determines a desired speed trajectory for controlling the engine to the desired stopping position.

Actual engine speed and engine position is then determined at 615. With the desired stopping position, desired speed trajectory, and actual position and speed of the engine determined, at 620 method 600 includes commanding or maintaining intake valves on all engine cylinders closed. Maintaining the intake valves closed may serve to reduce air flow to the exhaust catalyst, which may reduce emissions at subsequent engine starts, as discussed above.

Continuing to 625, method 600 includes selecting engine cylinders to provide engine braking. The cylinders may be selected to stop the engine as fast as possible at the desired position, such that in the case where the operator of the vehicle requests increased engine torque, the engine may already be stopped and vehicle inertia may be used to restart the engine, as will be elaborated in more detail below. For example, all engine cylinders may be relied upon for stopping the engine as rapidly as possible at the desired stopping position. In this methodology, with the intake valves closed, control of exhaust valves may be used to control the engine braking, by way of compression braking or expansion braking.

With the cylinder or cylinders selected at 625, method 600 proceeds to 630, where the exhaust valve(s) are controlled for the selected cylinders to provide compression or expansion braking. In some examples all of the selected cylinders may rely on compression or expansion braking, or the controller may rely on some combination of compression and expansion braking in order to control the engine to the desired stopping position in line with the desired speed trajectory.

Continuing to 635, while the engine is being controlled to the desired stopping position and after the engine has been stopped, method 600 includes adjusting transmission gearing as a function of vehicle speed in order to have the transmission in a desired gearing in the event that increased engine torque is requested prior to the vehicle coming to a stop. Adjusting transmission gearing at 635 may include shifting to a fourth gear as vehicle speed drops to a first speed, then to a third gear as vehicle speed drops further to a second, lower speed, then to a second gear as vehicle speed drops further to a third, even lower speed, and then to a first gear as vehicle speed drops to a fourth yet further lower speed, as discussed above with regard to FIG. 3B. Other variations are within the scope of this disclosure. For example, rather than starting at the fourth gear, the transmission gearing may be adjusted by controlling the gearing to the third gear as vehicle speed drops to the first speed, the second gear as vehicle speed drops further to the second speed, and first gear as vehicle speed drops still further to the third speed. In still other examples, rather than starting at the third gear, the transmission gearing may be adjusted by controlling the gearing to the second gear as vehicle speed drops to the first speed, and then to the first gear as vehicle speed drops further to a second speed. It may be understood that in order to enable transmission shifting while the engine is being stopped (or while the engine is at rest), the transmission may be shifted, for example, via hydraulic pressure generated by an electrically driven pump. The gearing of the transmission may in some examples be selected based on the available torque that the gearing may transfer from tires of the vehicle back to the engine.

Proceeding to 640, method 600 includes indicating whether the vehicle has come to a stop. If so, then method 600 proceeds to 645, where the engine is maintained shut down until the next engine restart request from the vehicle stopped condition. Method 600 may then end.

Returning to 640, in response to the vehicle not being stopped, method 600 continues to 650. At 650, method 600 includes indicating whether an engine restart is being requested. An engine restart may be understood to be requested in response to the operator requesting increased engine torque to propel the vehicle. In the event that an engine restart is not requested, method 600 continues to query as to whether the vehicle is stopped, and if not, whether an engine restart is requested.

In the event that an engine restart is requested at 650, method 600 proceeds to 655. At 655, method 600 includes recoupling the engine to vehicle wheels, and using vehicle inertia to rotate the engine. While not explicitly shown at FIG. 6, at 655, it may be understood that engine controls may be adjusted for restarting the engine. For example, one or more parameters including but not limited to spark timing, fuel injection amount and/or pressure and/or timing, throttle position, valve timing and/or amount of valve lift, etc., may be adjusted for restarting the engine. The above-mentioned parameters may be adjusted as a function of current vehicle speed when the engine restart is requested. The intake and exhaust valves may in some examples be controlled to reduce engine pumping work to start the engine, to reduce torque disturbances for restarting the engine and for easier engine rotation. In one example where the vehicle includes direct fuel injection options, fuel may be injected into engine cylinders before the engine is recoupled to the vehicle wheels, which may assist in starting the engine when the fueling and spark are provided and the engine is reconnected to the wheels. The throttle may be controlled to a desired position that is based on the current engine speed, for controlling the amount of air entering engine cylinders at the engine restart event.

In some examples, while not explicitly illustrated at FIG. 6, the controller may determine whether the restart event may be improved via the use of the starter motor in addition to restarting the engine using vehicle inertia by recoupling the transmission to the wheels. The determination may be a function of vehicle speed at the time of the restart request. For example, if vehicle speed is below a lower threshold vehicle speed, then the starter may be employed to assist the restart of the engine.

Thus, based on the above, it may be understood that in response to a request to restart the engine, the engine may be reconnected to the wheels, and fueling and spark may be provided to engine cylinders in order to resume the combustion mode of operation. By reconnecting the wheels to the engine, vehicle inertia may be used to rotate the engine, in some examples without relying on the starter motor for assistance. In a case where the engine can be restarted without relying on the starter motor for assistance, the restart may be conducted in a manner that improves fuel economy, by avoiding the use of energy stored in the battery.

Responsive to the engine being restarted at 655, method 600 proceeds to 660. At 660, method 600 includes controlling the engine based on driver demand. Method 600 then ends.

Turning now to FIG. 7, a prophetic example timeline 700 is depicted, illustrating in detail how intake and exhaust valves may be controlled according to the methods discussed herein, in particular with regard to the method of FIG. 6. Timeline 700 includes plot 705, indicating whether the intake valve of a first cylinder of the engine is open or closed, and plot 710, indicating whether the exhaust valve of the first cylinder is open or closed, over time. Timeline 700 further includes plot 715, indicating whether the intake valve of a second cylinder of the engine is open or closed, and plot 720, indicating whether the exhaust valve of the second cylinder is open or closed, over time. Timeline 700 further includes plot 725, indicating whether the intake valve of a third cylinder of the engine is open or closed, and plot 730, indicating whether the exhaust valve of the fourth cylinder is open or closed, over time. Timeline 700 further includes plot 735, indicating whether the intake valve of a fourth cylinder of the engine is open or closed, and plot 740, indicating whether the exhaust valve of the fourth cylinder of the engine is open or closed, over time. Timeline 700 further includes plot 745, indicating vehicle speed, over time. For each engine cylinder depicted, crank angle is shown, referenced to top-dead-center (TDC) of the respective cylinder (e.g., 0 is TDC of compression). The vehicle may be stopped, or traveling at a speed that is greater than (+) stopped. Timeline 700 further includes plot 750, indicating whether fuel injection to engine cylinders is on or off, over time. In this example timeline, as will be elaborated in further detail below, fuel is not being injected to any engine cylinders, hence just one plot is depicted for fuel injection. Timeline 700 further includes plot 755, indicating engine speed, over time. The engine may either be stopped, or rotating at a speed greater than (+) stopped. Timeline 700 further includes plot 760, indicating whether the engine is decoupled from vehicle wheels (yes or no), over time. Timeline 700 further includes plot 765, indicating fuel level in the fuel tank of the vehicle, over time.

At time t0, it may be understood that the operator of the vehicle has previously requested speed reduction of the vehicle, and thus the engine is being operated in a fuel shut off (FSO) condition, with fueling to engine cylinders discontinued (plot 750). With fueling discontinued, the exhaust valves for each cylinder (refer to plots 710, 720, 730 and 740) are commanded closed. By commanding closed the exhaust valves, the pumping of oxygen to the catalyst may be avoided. Between time t0 and t1, the intake valves of each of the engine cylinders (refer to plots 705, 715, 725 and 735) are shown to be opened and closed near the top and bottom of piston strokes. By opening and closing the intake valves in this manner, compression and expansion work may increase engine speed reduction, and because the engine is still coupled to vehicle wheels (plot 760), the increase in engine speed reduction may be used to assist in vehicle speed reduction. Accordingly, with the engine being operated in the fuel shut off mode between time t0 and t1, vehicle speed decreases (plot 745) along with engine speed (plot 755).

At time t1, engine speed is within the threshold (refer to line 757) of engine idle speed, here represented by line 756. It may be understood that the threshold represented by line 757 may be the same as the threshold at FIG. 3B represented by line 357, and that engine idle speed represented by line 756 may be the same as the engine idle speed represented by line 356 at FIG. 3B. As discussed above with regard to FIGS. 3A-3B, in some examples when engine speed is within the threshold of engine idle speed, the engine may be fueled. However, in other examples, the engine may not be fueled when engine speed is within the threshold of engine idle speed (refer to FIG. 3B). In this example timeline, it may be understood that the environmentally friendly mode of operation has been selected by the operator of the vehicle, via an HMI. Thus, because the environmentally friendly mode of operation has been selected, the engine may be maintained unfueled under circumstances where the vehicle is slowing and engine speed is within the threshold of engine idle speed, provided conditions are met for doing so. As discussed above, one such condition may be fuel level in the fuel tank below a threshold fuel level.

In this example timeline 700, fuel level in the fuel tank is below the threshold fuel level (represented by line 766). Accordingly, rather than providing fueling to engine cylinders in order to maintain engine speed at the engine idle speed, the engine is maintained unfueled (plot 750).

Responsive to the engine speed coming within the threshold of engine idle speed, the control strategy for the intake and exhaust valves changes. Specifically, instead of continuing to control intake valves in a manner to reduce engine speed, the intake valves are all commanded closed, while maintaining closed the exhaust valves. With intake and exhaust valves closed, engine pumping work may be reduced, which may enable the vehicle to coast for a longer period of time as compared to a situation where engine braking is continued to be relied upon, which may be advantageous in improving fuel economy by improving vehicle coasting ability.

Accordingly, between time t1 and t2, with engine cylinders sealed and acting as air springs, engine speed and vehicle speed decline. It may be understood that in a case where the vehicle operator is requesting friction braking, engine speed may decrease in conjunction with vehicle speed provided that the engine is coupled to the wheels.

At time t2, engine speed has dropped to the threshold amount (refer to line 758) below engine idle speed (line 756). It may be understood that the threshold amount (line 758) below engine idle speed at FIG. 7 may be the same as the threshold amount below engine idle speed discussed above at FIG. 3B (refer to line 358 at FIG. 3B). With engine speed the threshold amount below engine idle speed, an engine stop routine is initiated. The engine stop routine includes decoupling the engine from the vehicle wheels as discussed above with regard to the method of FIG. 6. The controller determines a desired stopping position for the engine, and in turn determines a speed trajectory for stopping the engine at the desired stopping position. Based on the speed trajectory, the controller selects engine cylinders for controlling the engine speed in a manner that enables the engine to be stopped at the desired stopping position. In this example timeline 700, the controller determines that all cylinders can be used to control engine speed via the determined speed trajectory to stop the engine at the desired stopping position. Between time t2 and t3, intake valves for all cylinders are maintained closed. However, the exhaust valve of each cylinder is opened/closed near the top and bottom of piston strokes for that cylinder, and the controlling of the valve in this manner serves to increase engine braking in a manner that stops the engine at the desired stopping position. By maintaining closed the intake valves for all cylinders, it may be understood that oxygen may not be pumped through to the catalyst, which may improve fuel economy and reduce undesired emissions at subsequent restarts.

It may be understood that the number of exhaust valve opening and closing events for each engine cylinder may be adjusted, depending on the determined speed trajectory and desired stopping position. Furthermore, in some examples the amount of valve lift may be controlled for the exhaust valves. In some examples, valve lift for the exhaust valves may be controlled to maximum valve lift for each opening event of the exhaust valves. In another example, some fraction of exhaust valves may be controlled to maximum lift, while another fraction of exhaust valves may be controlled to less than the maximum lift (e.g., some percentage of maximum lift). It may be understood that the controlling of valve lift amount for each exhaust valve may enable fine control over the amount of braking that the opening/closing of exhaust valves imparts on the engine. In some examples, based on the determined speed trajectory and desired stopping position, a lookup table or tables may be queried via the controller in order to infer the amount of valve lift to be used for each exhaust valve for selected cylinders, in order to control the engine to the desired stopping position based on the determined speed trajectory for stopping the engine.

In this example timeline 700, the engine stops at the desired stopping position at time t3. However, the vehicle still has not come to a stop. With the engine stopped and decoupled from vehicle wheels, as discussed above (but not explicitly illustrated at FIG. 7) it may be understood that transmission gearing may be adjusted as a function of vehicle speed, to enable the transmission to be in a desired gearing for an engine restart provided an engine restart is requested prior to the vehicle coming to a complete stop. As discussed above, in the event that an engine restart is requested prior to the vehicle coming to a stop, the transmission may be recoupled to the transmission and thus the vehicle wheels, and vehicle inertia may be used to rotate the engine and fueling and spark may commence in order to restart the engine.

Turning now to FIG. 8, a prophetic example timeline 800 is depicted, illustrating in detail how intake and exhaust valves may be controlled according to the methods discussed herein, in particular with regard to the method of FIG. 5. Timeline 800 includes plot 805, indicating whether the intake valve of a first cylinder of the engine is open or closed, and plot 810, indicating whether the exhaust valve of the first cylinder is open or closed, over time. Timeline 800 further includes plot 815, indicating whether the intake valve of a second cylinder of the engine is open or closed, and plot 820, indicating whether the exhaust valve of the second cylinder is open or closed, over time. Timeline 800 further includes plot 825, indicating whether the intake valve of a third cylinder of the engine is open or closed, and plot 830, indicating whether the exhaust valve of the fourth cylinder is open or closed, over time. Timeline 800 further includes plot 835, indicating whether the intake valve of a fourth cylinder of the engine is open or closed, and plot 840, indicating whether the exhaust valve of the fourth cylinder of the engine is open or closed, over time. Timeline 800 further includes plot 845, indicating vehicle speed, over time. For each engine cylinder depicted, crank angle is shown, referenced to top-dead-center (TDC) of the respective cylinder (e.g., 0 is TDC of compression). The vehicle may be stopped, or traveling at a speed that is greater than (+) stopped. Timeline 800 further includes plot 850, indicating whether fuel injection to engine cylinders is on or off, over time. In this example timeline, as will be elaborated in further detail below, fuel is either being injected to no cylinders, or to all engine cylinders, and hence just one plot is depicted for fuel injection. Timeline 800 further includes plot 855, indicating engine speed, over time. The engine may either be stopped, or rotating at a speed greater than (+) stopped. Timeline 800 further includes plot 860, indicating fuel level in the fuel tank of the vehicle, over time.

At time t0, it may be understood that the operator of the vehicle has previously requested speed reduction of the vehicle, and thus the engine is being operated in a fuel shut off (FSO) condition, with fueling to engine cylinders discontinued (plot 850). With fueling discontinued, the exhaust valves for each cylinder (refer to plots 810, 820, 830 and 840) are commanded closed. By commanding closed the exhaust valves, the pumping of oxygen to the catalyst may be avoided. Between time t0 and t1, the intake valves of each of the engine cylinders (refer to plots 805, 815, 825 and 835) are shown to be opened and closed near the top and bottom of piston strokes. By opening and closing the intake valves in this manner, compression and expansion work may increase engine speed reduction, which may further assist in vehicle speed reduction. Accordingly, with the engine being operated in the fuel shut off mode between time t0 and t1, vehicle speed decreases (plot 845) along with engine speed (plot 855).

At time t1, engine speed is within the threshold (refer to line 857) of engine idle speed, here represented by line 856. It may be understood that the threshold represented by line 857 may be the same as the threshold at FIG. 3A represented by line 307, and that engine idle speed represented by line 856 may be the same as the engine idle speed represented by line 306 at FIG. 3A. In this example timeline, fuel level in the fuel tank is above the threshold fuel level (represented by line 866). Accordingly, fueling is provided (plot 850) to engine cylinders in order to maintain engine speed at the engine idle speed.

Responsive to the fueling of the engine, the control strategy for the intake and exhaust valves changes. Specifically, intake and exhaust valve operation is resumed for all engine cylinders. In this example timeline, the firing order of the engine is 4-2-1-3. With the engine fueled, the controller controls fuel injection parameters to maintain the engine at the idle speed. While all cylinders are depicted as being fueled, in other examples it may be understood that just a fraction (e.g., 2) of cylinders may be fueled, and the other cylinders may be controlled in a manner to block the flow of oxygen to the catalyst. For example, for remaining unfueled cylinders, the intake valves may be closed while the exhaust valve is held open. Alternatively, the exhaust valves may be closed and the intake valve may be held open. In yet another example, both intake and exhaust valves may be closed. At time t2, the vehicle comes to a stop, and accordingly fueling to the engine is discontinued (plot 850). Responsive to the vehicle coming to a stop, the controller determines a desired stopping position for the engine, and in turn determines a speed trajectory for stopping the engine at the desired stopping position. Because the speed of the engine is being controlled to the desired stop position from engine idle speed, rather than from the threshold amount below engine idle speed (refer to FIG. 3B and FIG. 7), and because the engine is being controlled to the desired stop position while the vehicle is stopped, it may not be as imperative to stop the engine as fast as when the vehicle is still in motion (refer to FIG. 7). Based on the speed trajectory, the controller selects engine cylinders for controlling the engine speed in a manner that enables the engine to be stopped at the desired stopping position. In this example timeline 800, the controller determines that the second cylinder and the fourth cylinder can be used to stop the engine at the desired stopping position, given the determined speed trajectory. In other words, the controller determines that just a fraction of an entirety of engine cylinders may be used to control the engine to the desired stopping position. Furthermore, because the engine is being stopped from a combustion mode of operation, intake valves are used for the engine braking, as opposed to the strategy discussed above where exhaust valves were used for engine braking, when stopping the engine from a non-combusting state.

Accordingly, between time t2 and t3, intake valves for the selected cylinders are controlled in a manner determined via the controller (for example based on a lookup table), to stop the engine at the desired stopping position. Specifically, for each of the second cylinder and the fourth cylinder, the intake valves are opened and closed near bottom dead center (but not top dead center). By controlling the intake valves in this manner, the engine stops at the desired stopping position at time t3. Exhaust valves for each of the engine cylinders are maintained closed, to reduce opportunity for routing oxygen to the catalyst.

In this way, fuel economy may be improved and emissions reduced. Specifically, by avoiding the flowing of air to a catalyst during vehicle speed reduction routines and/or engine stop routines, fuel consumption at subsequent engine starts may be reduced, because additional fuel may not be needed to reset the state of the catalyst. Furthermore, by controlling how the engine is fueled during speed reduction requests, the consumption of fuel may be reduced, which may be particularly advantageous under circumstances where fuel level in a fuel tank is low.

The technical effect of enabling a vehicle controller to select whether to fuel the engine during a vehicle speed reduction condition when engine speed becomes within the threshold of engine idle speed, or to avoid fueling the engine and instead stop the engine while the vehicle is still in motion and where engine speed has decreased to more than another threshold below engine idle speed, is that fuel economy may be improved, and emissions may be reduced. The technical effect of enabling a vehicle operator to select whether to operate in an environmentally friendly mode via an HMI, is that customer satisfaction may be improved. For example, some customers may prefer that the engine be fueled during vehicle speed reduction when engine speed becomes within the threshold of engine idle speed, whereas other customers may prefer the engine to be maintained off for environmental and fuel economy reasons. The technical effect of operating the engine with all intake valves and exhaust valves closed in response to engine speed becoming within the threshold of engine idle speed when the vehicle is being operated in the environmentally friendly mode, is to improve vehicle coasting, which may further improve fuel economy. The technical effect of relying on the use of exhaust valve operation while maintaining intake valves closed to control the engine to a desired stopping position in response to engine speed decreasing by more than the threshold lower than engine idle speed, is that intake valves may be maintained closed, thereby avoiding inducting any additional air charge into the engine during the engine shutdown routine. The technical effect of relying on continuously variable valve lift for exerting control over intake and/or exhaust valve operation for engine braking is that a desired stop position may be more accurately controlled.

In another embodiment, a method for a vehicle comprises in response to an engine speed becoming within a first threshold of an engine idle speed while an engine is unfueled, maintaining the engine unfueled and adjusting a second threshold that extends below but not above the engine idle speed, and controlling the engine to a desired stop position in response to the engine speed dropping below the second threshold. In a first example of the method, the second threshold is adjusted as a function of a vehicle speed. In a second example of the method, the second threshold is adjusted as a function of a fuel level in a fuel tank of the vehicle. In a third example of the method, the second threshold is adjusted as a function of a state of charge of a battery of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   during a deceleration event of a vehicle where an engine of the vehicle is unfueled, and responsive to a speed of the engine being within a first threshold speed of an engine idle speed, fueling the engine responsive to a fuel level in the fuel tank being greater than a threshold fuel level; and
   maintaining the engine unfueled responsive to the fuel level being lower than the threshold fuel level.

2. The method of claim 1, wherein resuming fueling of the engine further comprises:
   maintaining the speed of the engine within the first threshold speed of the engine idle speed until the vehicle comes to a stop, and then stopping the engine.

3. The method of claim 1, wherein maintaining the engine unfueled responsive to the fuel level being lower than the threshold fuel level further comprises a request via an operator of the vehicle to operate the vehicle in an environmentally friendly mode.

4. The method of claim 1, further comprising:
   maintaining the engine unfueled until the speed of the engine drops to a second threshold speed below the engine idle speed provided there is not a request for increased engine torque.

5. The method of claim 4, further comprising controlling the engine to a desired stop position in response to the speed of the engine dropping to the second threshold speed below the engine idle speed.

6. The method of claim 5, wherein controlling the engine to the desired stop position includes commanding or maintaining intake valves of the engine closed; and
   controlling a plurality of exhaust valves of the set of cylinders to generate a braking torque of the engine to control the engine to the desired stopping position.

\* \* \* \* \*